(12) United States Patent
Sakamoto et al.

(10) Patent No.: US 12,272,469 B2
(45) Date of Patent: Apr. 8, 2025

(54) CONDUCTIVE TWO-DIMENSIONAL PARTICLE AND METHOD FOR PRODUCING THE SAME

(71) Applicant: Murata Manufacturing Co., Ltd., Nagaokakyo (JP)

(72) Inventors: Hiroki Sakamoto, Nagaokakyo (JP); Masashi Koyanagi, Nagaokakyo (JP); Akimaro Yanagimachi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 81 days.

(21) Appl. No.: 18/175,981

(22) Filed: Feb. 28, 2023

(65) Prior Publication Data
US 2023/0207152 A1 Jun. 29, 2023

Related U.S. Application Data

(63) Continuation of application No. PCT/JP2021/031565, filed on Aug. 27, 2021.

(30) Foreign Application Priority Data

Sep. 2, 2020 (JP) .................... 2020-147676

(51) Int. Cl.
*H01B 1/24* (2006.01)
*C01B 32/90* (2017.01)

(52) U.S. Cl.
CPC .......... *H01B 1/24* (2013.01); *C01B 32/90* (2017.08); *C01P 2004/20* (2013.01); *C01P 2004/64* (2013.01); *C01P 2006/40* (2013.01)

(58) Field of Classification Search
CPC ........................................ H01B 1/24
See application file for complete search history.

(56) References Cited

U.S. PATENT DOCUMENTS

| | | | |
|---|---|---|---|
| 2020/0102444 A1 | 4/2020 | Cho et al. | |
| 2021/0094831 A1* | 4/2021 | Barsoum | C01B 32/921 |
| 2023/0159340 A1* | 5/2023 | Kamysbayev | C01B 32/90 |
| | | | 423/439 |

FOREIGN PATENT DOCUMENTS

| | | |
|---|---|---|
| CN | 111285359 A | 6/2020 |
| JP | 2017076739 A | 4/2017 |
| JP | 2020093971 A | 6/2020 |

OTHER PUBLICATIONS

International Search Report in PCT/JP2021/031565, mailed Oct. 26, 2021, 3 pages.

(Continued)

*Primary Examiner* — William D Young
(74) *Attorney, Agent, or Firm* — ArentFox Schiff LLP (57) ABSTRACT

A conductive two-dimensional particle of a layered material comprising one layer or one layer and plural layers, wherein the layer includes a layer body represented by: $M_mX_n$, and a modifier or terminal T exists on a surface of the layer body, wherein T is at least one selected from the group consisting of a hydroxyl group, a fluorine atom, a chlorine atom, an oxygen atom, or a hydrogen atom, M of the layer is bonded to at least one selected from the group consisting of $PO_4^{3-}$, I, or $SO_4^{2-}$, the total content of chlorine and bromine is 1,500 ppm by mass or less, and an average value of major diameters of two-dimensional surfaces of the conductive two-dimensional particles is 1.0 μm or more.

8 Claims, 8 Drawing Sheets

(56) References Cited

OTHER PUBLICATIONS

Mei et al., "Two-dimensional fluorine-free mesoporous Mo2C MXene via UV-induced selective etching of Mo2Ga2C for energy storage," Sustainable Materials and Technologies, Jan. 2020, vol. 25, Article No. e00156, pp. 1-8.

Kim et al., "Nonpolar Organic Dispersion of 2D Ti3C2Tx MXene Flakes via Simultaneous Interfacial Chemical Grafting and Phase Transfer Method," ACS Nano, Nov. 2019, vol. 13, pp. 13818-13828.

Voigt et al., "Anion Adsorption Ti3C2Tz MXene Multilayers, and Their Effect on Claylike Swelling," The Journal of Physical Chemistry C, Sep. 2018, vol. 122, pp. 23172-23179.

* cited by examiner

CONDUCTIVE TWO-DIMENSIONAL PARTICLE AND METHOD FOR PRODUCING THE SAME

CROSS REFERENCE TO RELATED APPLICATIONS

The present application is a continuation of International application No. PCT/JP2021/031565, filed Aug. 27, 2021, which claims priority to Japanese Patent Application No. 2020-147676, filed Sep. 2, 2020, the entire contents of each of which are incorporated herein by reference.

FIELD OF THE INVENTION

The present invention relates to a conductive two-dimensional particle and a method for producing the same.

BACKGROUND OF THE INVENTION

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electrical devices. For the above application, it is required to further enhance the conductivity of a material containing MXene.

Non-Patent Document 1 discloses that, for example, for the purpose of realizing a stretchable electrode, a $Ti_3C_2Tx$ MXene dispersion stable in an organic solvent is prepared for mixing with a non-polar polymer matrix soluble in an organic medium. Specifically, $Ti_3C_2Tx$ flakes with alkyl phosphonic acid (R—P(=O)(OH$_2$) adsorbed on the surface are shown. The $Ti_3C_2Tx$ flakes are prepared by etching $Ti_3AlC_2$ using an etching solution in which LiF is dissolved in HCl, and —F, —Cl, —O, and —OH are present on the surface of $Ti_3C_2$.

Non-Patent Document 2 discloses that MXene is a new two-dimensional (2D) nanomaterial as a promising electrode material for an energy storage device, and as a method for producing the MXene, $Mo_2Ga_2C$ is added to $H_3PO_4$, and the mixture is stirred while being irradiated with UV light to etch Ga, thereby obtaining $Mo_2C$ as MXene. Furthermore, it is shown that ultrasonic treatment is performed to peel a multilayer MXene to obtain a single-layer MXene. In the obtained $Mo_2C$, P and O exist on the surface, and the flake size is 100 nm or less.

Non-Patent Document 3 discloses a multilayer MXene (multilayer $Ti_3C_2$) synthesized by etching $Ti_3AlC_2$ with HF+$H_3PO_4$, HF+HI, or HF+$H_2SO_4$.

Non-Patent Document 1: Nonpolar Organic Dispersion of 2D Ti3C2Tx MXene Flakes via Simultaneous Interfacial Chemical Grafting and Phase Transfer Method. ACS Nano 2019, 13, 12, 13818-13828

Non-Patent Document 2: Two-dimensional fluorine-free mesoporous Mo2C MXene via UV-induced selective etching of Mo2Ga2C for energy storage. Sustainable Materials and Technologies Volume 25, September 2020, e00156

Non-Patent Document 3: Anion Adsorption, Ti3C2Tz MXene Multilayers, and Their Effect on Claylike Swelling J. Phys. Chem. C 2018, 122, 40, 23172-23179

SUMMARY OF THE INVENTION

In the electronic equipment industry and the like, as a part of green procurement, it is required that the content of chlorine and bromine among halogens is suppressed to a certain level or less, that is, "halogen-free". Specifically, the content of chlorine is required to be 900 ppm by mass or less, the content of bromine is required to be 900 ppm by mass or less, and the total content of chlorine and bromine is required to be 1,500 ppm by mass or less.

In Non-Patent Document 1, —Cl exists on the surface of $Ti_3C_2Tx$, and the amount of chlorine exceeds 1,500 ppm by mass. Therefore, it cannot be used for applications requiring the halogen-free. Further, an alkyl group having low conductivity is adsorbed on the surface of $Ti_3C_2Tx$, and a film obtained by stacking $Ti_3C_2Tx$ is considered to have low conductivity.

In Non-Patent Document 2, in order to peel the multilayer MXene to obtain the single-layer MXene, the multilayer MXene is subjected to ultrasonic treatment with a strong shear force. As a result, the size of the obtained single-layer MXene is reduced.

The MXene obtained in Non-Patent Document 3 is a multilayer MXene. In order to produce a film using this multilayer MXene, a certain amount of binder is essential.

The present invention has been made in view of the above circumstances, and an object of the present invention is to provide a conductive two-dimensional particle which has a content of chlorine and bromine of a certain level or less, is suitable for halogen-free applications, and can form a highly conductive film without using a binder, and a method for producing a conductive two-dimensional particle.

According to one aspect of the present invention, there is provided a conductive two-dimensional particle of a layered material comprising one layer or one layer and plural layers, wherein the layer includes a layer body represented by: $M_mX_n$, wherein M is at least one metal of Group 3, 4, 5, 6, or 7, X is a carbon atom, a nitrogen atom, or a combination thereof, n is 1 to 4, and m is more than n and 5 or less, and a modifier or terminal T exists on a surface of the layer body, wherein T is at least one selected from the group consisting of a hydroxyl group, a fluorine atom, a chlorine atom, an oxygen atom, or a hydrogen atom, the M is bonded to at least one selected from the group consisting of $PO_4^{3-}$, I, or $SO_4^{2-}$, a total content of chlorine and bromine is 1,500 ppm by mass or less, and an average value of major diameters of two-dimensional surfaces of the conductive two-dimensional particles is 1.0 μm or more.

According to another aspect of the present invention, there is provided a method for producing a conductive two-dimensional particle, the method comprising: (a) preparing a precursor represented by: $M_mAX_n$, wherein M is at least one metal of Group 3, 4, 5, 6, or 7, X is a carbon atom, a nitrogen atom, or a combination thereof, A is at least one metal of Group 12, 13, 14, 15, or 16, n is 1 to 4, and m is more than n and 5 or less; and (b) etching the A atoms from the precursor using an etching solution, the etching solution satisfying at least one selected from the group consisting of an $H_3PO_4$ concentration of 5.5 M or more, an HI concentration of 5.0 M or more, or an $H_2SO_4$ concentration of 5.0 M or more.

According to the present invention, there is provided a conductive two-dimensional particle which is formed of a predetermined layered material (also referred to as "MXene" in the present specification), in which M in the layer and at least one selected from the group consisting of $PO_4^{3-}$, I, or $SO_4^{2-}$ are bonded, a total content of chlorine and bromine is 1,500 ppm by mass or less, and an average value of major diameters of two-dimensional surfaces of the conductive two-dimensional particle is 1.0 μm or more. With this, the conductive two-dimensional particle contains MXene, is suitable for halogen-free applications, and is capable of forming a highly conductive film without using a binder. Further, according to the present invention, the conductive two-dimensional particle can be produced by etching a predetermined precursor using an etching solution that satisfies at least one selected from the group consisting of an $H_3PO_4$ concentration of 5.5 M or more, an HI concentration of 5.0 M or more, or an $H_2SO_4$ concentration of 5.0 M or more.

DESCRIPTION OF PREFERRED EMBODIMENTS OF THE INVENTION

Embodiment 1: Conductive Two-Dimensional Particle

Hereinafter, a conductive two-dimensional particle in one embodiment of the present invention will be described in detail, but the present invention is not limited to such an embodiment.

The conductive two-dimensional particle in the present embodiment is the conductive two-dimensional particle of a layered material comprising one layer or one layer and plural layers,
wherein the layer includes
a layer body (the layer body may have a crystal lattice in which each X is located in an octahedral array of M) represented by a formula below:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and a modifier or terminal T existing on a surface (more particularly, at least one of the two opposing surfaces of the layer body) of the layer body, wherein T is at least one selected from the group consisting of a hydroxyl group, a fluorine atom, a chlorine atom, an oxygen atom, or a hydrogen atom.

The layered material can be understood as a layered compound and is also denoted by "$M_mX_nT_s$", in which s is an optional number, and in the related art, x or z may be used instead of s. Typically, n can be 1, 2, 3, or 4, but is not limited thereto.

In the above formula of MXene, M is preferably at least one selected from the group consisting of Ti, Zr, Hf, V, Nb, Ta, Cr, Mo, or Mn, and more preferably at least one selected from the group consisting of Ti, V, Cr, or Mo.

MXenes whose above formula $M_mX_n$ is expressed as below are known:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $Mo_{1.3}Y_{0.6}C$ (in the above formula, "1.3" and "0.6" mean about 1.3 (=4/3) and about 0.6 (=2/3), respectively.)

$Ti_3C_2$, $Ti_3N_2$, $Ti_3(CN)$, $Zr_3C_2$, $(Ti, V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti,Nb)_4C_3$, $(Nb,Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (in the above formula, "2.7" and "1.3" mean about 2.7 (=8/3) and about 1.3 (=4/3), respectively.)

Typically, in the above formula, M can be titanium or vanadium and X can be a carbon atom or a nitrogen atom. For example, the MAX phase is $Ti_3AlC_2$ and MXene is $Ti_3C_2T_s$ (in other words, M is Ti, X is C, n is 2, and m is 3).

It is noted that, in the present invention, MXene may contain remaining A atoms at a relatively small amount, for example, at 10 mass % or less with respect to the original amount of A atoms. The remaining amount of A atoms can be preferably 8 mass % or less, and more preferably 6 mass % or less. However, even if the residual amount of A atoms exceeds 10 mass %, there may be no problem depending on the application and use conditions of the conductive two-dimensional particle.

Figure 1:
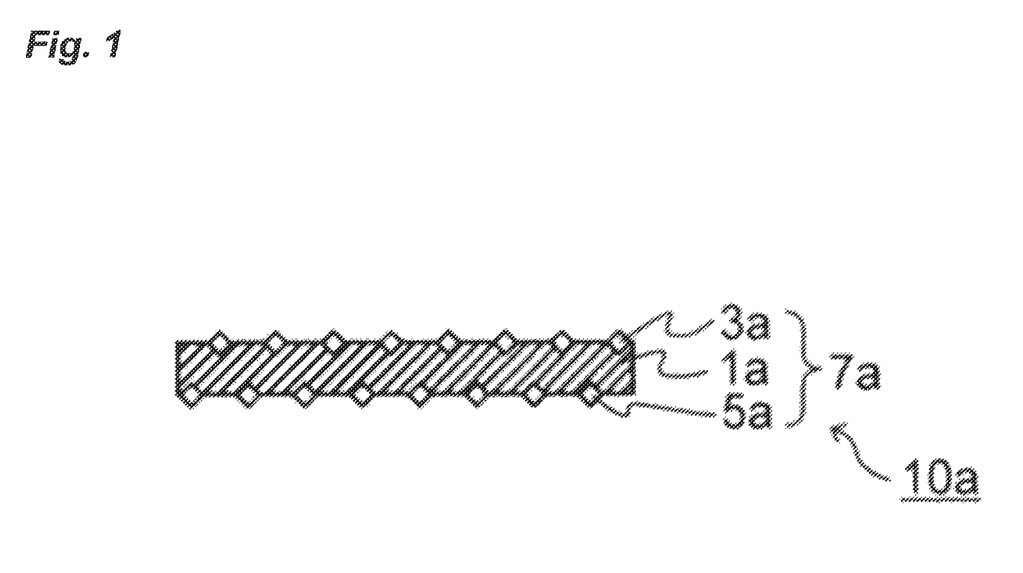
FIG. 1 is a schematic cross-sectional view illustrating a single-layer MXene that is a layered material according to one embodiment of the present invention.

The conductive two-dimensional particle of the present embodiment is an aggregate containing one layer of MXene 10a (single-layer MXene) schematically illustrated in FIG. 1. More specifically, MXene 10a is an MXene layer 7a having layer body ($M_mX_n$ layer) 1a represented by $M_mX_n$, and modifier or terminals T3a and 5a existing on the surface (more specifically, at least one of two surfaces facing each other in each layer) of the layer body 1a. Therefore, the MXene layer 7a is also represented as "$M_mX_nT_s$", and s is an optional number.

Figure 2:
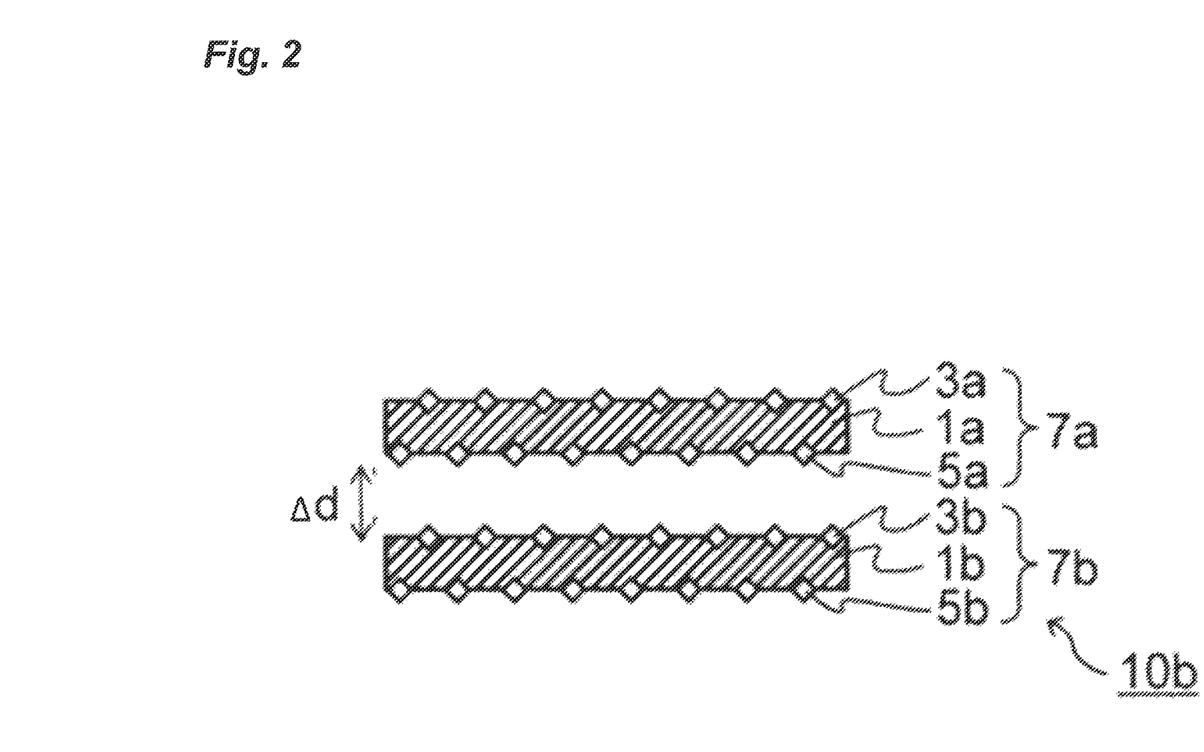
FIG. 2 is a schematic cross-sectional view illustrating a multilayer MXene that is a layered material according to one embodiment of the present invention.

The conductive two-dimensional particle of the present embodiment may include one layer and plural layers. Examples of the MXene (multilayer MXene) of the plural layers include, but are not limited to, two layers of MXene 10b as schematically illustrated in FIGS. 2. 1b, 3b, 5b, and 7b in FIG. 2 are the same as 1a, 3a, 5a, and 7a in FIG. 1 described above. Two adjacent MXene layers (for example, 7a and 7b) of the multilayer MXene do not necessarily have to be completely separated from each other, and may be partially in contact with each other. The MXene 10a may be a mixture of the single-layer MXene 10a and the multilayer MXene 10b, in which the multilayer MXene 10b is individually separated and exists as one layer and the unseparated multilayer MXene 10b remains.

Although the present embodiment is not limited, the thickness of each layer of MXene (which corresponds to the MXene layers 7a and 7b) is, for example, 0.8 nm to 5 nm, particularly 0.8 nm to 3 nm (which may mainly vary depending on the number of M atom layers included in each layer). For the individual laminates of the multilayer MXene that can be included, the interlayer distance (alternatively, a void dimension is indicated by Δd in FIG. 2) is, for example, 0.8 nm to 10 nm, particularly 0.8 nm to 5 nm, and more particularly about 1 nm, and the total number of layers can be 2 to 20,000.

In the conductive two-dimensional particle of the present embodiment, the multilayer MXene that can be included is preferably MXene having a few layers obtained through the delamination treatment. The term "the number of layers is small" means that, for example, the number of stacked layers of MXene is 6 or less. The thickness, in the stacking direction, of the multilayer MXene having a few layers is preferably 10 nm or less. Hereinafter, the "multilayer MXene having a few layers" may be referred to as a "few-layer MXene" in some cases. In addition, the single-layer MXene and the few-layer MXene may be collectively referred to as "single-layer/few-layer MXene" in some cases.

The conductive two-dimensional particle of the present embodiment preferably contains a single-layer MXene and a few-layer MXene, that is, a single-layer/few-layer MXene. In the conductive two-dimensional particle of the present embodiment, the ratio of the single-layer/few-layer MXene having a thickness of 10 nm or less is preferably 90 vol % or more, and more preferably 95 vol % or more.

In the conductive two-dimensional particle of the present embodiment, M of the layer is bonded to at least one selected from the group consisting of $PO_4^{3-}$ (phosphate ion), I (iodine), or $SO_4^{2-}$ (sulfate ion). The $PO_4^{3-}$, I, and $SO_4^{2-}$ in the conductive two-dimensional particle of the present embodiment can be derived from $H_3PO_4$ (phosphoric acid), HI (hydrogen iodide), and $H_2SO_4$ (sulfuric acid) contained in the etching solution used at the time of etching the MAX phase, which is a precursor of MXene.

It is possible to confirm that M of the layer is bonded to $PO_4^{3-}$, $SO_4^{2-}$, or the like by performing high-resolution analysis (narrow scan analysis) using an X-ray photoelectron spectrometer.

The conductive two-dimensional particle of the present embodiment may contain at least one selected from the group consisting of a phosphorus atom derived from the $PO_4^{3-}$, an iodine atom derived from the I, or a sulfur atom derived from the $SO_4^{2-}$. The conductive two-dimensional particle of the present embodiment more preferably contains a phosphorus atom derived from the $H_3PO_4$ (phosphoric acid), and further derived from the $PO_4^{3-}$. The conductive two-dimensional particle of the present embodiment more preferably satisfies at least one selected from the group consisting of a phosphorus atom content of 0.20 mass % to 14 mass %, an iodine atom content of 1.0 mass % to 60 mass %, or a sulfur atom content of 0.03 mass % to 18 mass %.

The fact that at least one selected from the group consisting of a phosphorus atom, an iodine atom, or a sulfur atom is contained and the content of each atom can be measured by, for example, inductively coupled plasma emission spectrometry (for example, ICP-AES), X-ray fluorescence analysis (XRF), or the like.

The conductive two-dimensional particle of the present embodiment has a total content of chlorine and bromine of 1,500 ppm by mass or less. Since chlorine and bromine are reduced in the conductive two-dimensional particle of the present embodiment, the conductive two-dimensional particle can be applied to applications in which halogen-free is required. The total content of chlorine and bromine is preferably 900 ppm by mass or less, and most preferably 0 ppm by mass or less. That is, in the present disclosure, "the conductive two-dimensional particle has a total content of chlorine and bromine of 1,500 ppm by mass or less" includes those containing substantially no chlorine and bromine.

(Average Value of Major Diameters of Two-Dimensional Surfaces of Conductive Two-Dimensional Particles)

In the conductive two-dimensional particle of the present embodiment, the average value of the major diameters of the two-dimensional surfaces is 1.0 μm or more. That is, in the single-layer/few-layer MXene according to the present embodiment, the average value of the major diameters of the two-dimensional surfaces is 1.0 μm or more. Hereinafter, the average value of the major diameters of the two-dimensional surfaces may be referred to as "average flake size".

The present inventors have separately confirmed the relationship between the average flake size of MXene and the conductivity of a film produced using this MXene in the following Table 1 (in Table 1 below, only the above relationship was confirmed, HCl was used as an etching solution, and the chlorine concentration in MXene was not reduced). As shown in Table 1, as the average flake size increases, the conductivity of the film increases, and a film having high conductivity can be obtained.

TABLE 1

| No. | Etching solution | Ultrasonic treatment time (h) | Average flake size (μm) | Film conductivity (S/cm) |
|---|---|---|---|---|
| 1 | HCl + LiF | 0.00 | 4.40 | 5200 |
| 2 | HCl + LiF | 0.25 | 1.00 | 4500 |
| 3 | HCl + LiF | 1.00 | 0.57 | 3800 |
| 4 | HCl + LiF | 3.00 | 0.35 | 2600 |

The average value of the major diameters of the two-dimensional surfaces is preferably 1.5 μm or more, and more preferably 2.5 μm or more. The average value is preferably 20 μm or less from the viewpoint of etching time (production cost). Since the conductive two-dimensional particle of the present embodiment has a large average value of major diameters of the two-dimensional surfaces (average flake size) of 1.0 μm or more, a film formed using the conductive two-dimensional particle, for example, a film obtained by stacking the conductive two-dimensional particles has high conductivity.

As described in examples to be described later, the major diameter of the two-dimensional surface refers to a major diameter when each MXene particle is approximated to an elliptical shape in an electron micrograph, and the average value of the major diameters of the two-dimensional surface refers to a number average of the major diameters of 80 particles or more. As the electron microscope, a scanning electron microscope (SEM) photograph or a transmission electron microscope (TEM) photograph can be used.

The average value of the major diameters of the conductive two-dimensional particles of the present embodiment may be measured by dissolving a conductive film containing the conductive two-dimensional particles in a solvent and dispersing the conductive two-dimensional particles in the solvent. Alternatively, it may be measured from an SEM image of the conductive film.

(Average Value of Thicknesses of Conductive Two-Dimensional Particles)

The average value of the thicknesses of the conductive two-dimensional particles of the present embodiment is 10 nm or less. The thickness is preferably 7 nm or less and more preferably 5 nm or less. On the other hand, in consideration of the thickness of the single-layer MXene, the lower limit of the thickness of the conductive two-dimensional particle may be 1.0 nm.

The average value of the thicknesses of the conductive two-dimensional particles is determined as a number average dimension (for example, a number average of at least 40 particles) based on an atomic force microscope (AFM) photograph or a transmission electron microscope (TEM) photograph.

In the conductive two-dimensional particle of the present embodiment, an alkyl group having low conductivity is not adsorbed on the surface of MXene as in Non-Patent Document 1. When an organic molecule having a bulky alkyl group having no conductivity is present on the surface of the two-dimensional material, the conductivity is lowered. On the other hand, since the conductive two-dimensional particle of the present embodiment does not have a structure in which an organic molecule having an alkyl group is adsorbed on the surface, the conductivity of the film produced by stacking is high.

Embodiment 2: Method for Producing Conductive Two-Dimensional Particle

Hereinafter, a method for producing a conductive two-dimensional particle in one embodiment of the present invention will be described in detail, but the present invention is not limited to such an embodiment.

The method for producing a conductive two-dimensional particle according to the present embodiment includes:
 (a) preparing a predetermined precursor; and
 (b) etching A atoms from the precursor using an etching solution, the etching solution satisfying at least one selected from the group consisting of an $H_3PO_4$ concentration of 5.5 M or more, an HI concentration of 5.0 M or more, or an $H_2SO_4$ concentration of 5.0 M or more.

Step (a)

First, a predetermined precursor is prepared. A predetermined precursor that can be used in the present embodiment is a MAX phase that is a precursor of MXene, and is represented by:

$M_mAX_n$ wherein M is at least one metal of Group 3, 4, 5, 6, or 7,
 X is a carbon atom, a nitrogen atom, or a combination thereof,
 A is at least one metal of Group 12, 13, 14, 15, or 16,
 n is 1 to 4, and
 m is more than n and 5 or less.

The above M, X, n, and m are as described in MXene. A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, or Cd, and is preferably Al.

The MAX phase has a crystal structure in which a layer constituted by A atoms is located between two layers represented by $M_mX_n$ (each X may have a crystal lattice located in an octahedral array of M). Typically, in the case of m=n+1, the MAX phase has a repeating unit in which one layer of X atoms is disposed between the layers of M atoms of n+1 layers (these layers are also collectively referred to as "$M_mX_n$ layer"), and a layer of A atoms ("A atom layer") is disposed as a next layer of the (n+1) th layer of M atoms; however, the present invention is not limited thereto.

The MAX phase can be produced by a known method. For example, a TiC powder, a Ti powder, and an Al powder are mixed in a ball mill, and the obtained mixed powder is calcined under an Ar atmosphere to obtain a calcined body (block-shaped MAX phase). Thereafter, the calcined body obtained is pulverized by an end mill to obtain a powdery MAX phase for the next step.

Step (b)

Etching (removing and layer-separating in some cases) A atoms (and a part of M atoms in some cases) from the precursor using an etching solution. As the etching solution, an etching solution satisfying at least one selected from the group consisting of an $H_3PO_4$ concentration of 5.5 M or more, an HI concentration of 5.0 M or more, or an $H_2SO_4$ concentration of 5.0 M or more can be used.

In the known method using hydrochloric acid, it is considered that $Cl^-$ present in the etching solution plays a role of causing steric hindrance. However, in order to achieve the above-mentioned halogen-free, a method without using hydrochloric acid has been desired. In a method in which the hydrochloric acid is not used for the etching solution, it is difficult to easily form a single layer, and treatment having very strong shearing force such as ultrasonic treatment is required. However, as the single-layer MXene obtained by receiving a strong shear force, as described above, in-plane fracture occurs, and only the single-layer MXene having a small two-dimensional surface can be obtained.

In the present embodiment, at least one selected from the group consisting of $PO_4^{3-}$, I, or $SO_4^{2-}$ present in the etching solution is adsorbed and bonded to the surface of the exposed $M_mX_n$ layer after etching (removing and layer-separating in some cases) the A atoms (and a part of M atoms in some cases) from the MAX phase. It is considered that when these $PO_4^{3-}$ and the like are adsorbed on the surface of the $M_mX_n$ layer, the distance between the MXene layers is increased due to steric hindrance, and the van der Waals force between the $M_mX_n$ layers is weakened. As a result, it is considered that the $M_mX_n$ layer can be easily formed into a single layer without applying strong shear to the multi-layered $M_mX_n$ layer. In addition, since it is not necessary to apply strong shearing, destruction of the $M_mX_n$ layer in a plane is suppressed, and as a result, a single-layer $M_mX_n$ layer having a large two-dimensional surface can be obtained.

The etching solution does not contain hydrochloric acid used in a known etching solution, that is, does not contain chlorine atoms. The phrase "does not contain chlorine atoms" of etching solution means that the chlorine concentration in the etching solution is, for example, 10 ppm by mass or less as measured by combustion-ion chromatography.

The etching solution does not contain hydrochloric acid that has been used in the related art, and may contain at least one of the predetermined amounts of $H_3PO_4$ and the like, and other configurations of the etching solution are not particularly limited, and known conditions can be adopted. For example, the method can be performed using an etching solution further containing F⁻, and examples thereof include a method using a mixed solution of hydrofluoric acid (HF) and at least one of the predetermined amounts of $H_3PO_4$ and the like. The concentration of hydrofluoric acid in the mixed solution may be 1 mass % to 50 mass % or less.

The $H_3PO_4$ concentration, the HI concentration, and the $H_2SO_4$ concentration in the etching solution are preferably as high as possible, and thus the upper limit thereof is not particularly limited, but for example, the $H_3PO_4$ concentration can be 13.2 M or less, the HI concentration can be 6.5 M or less, and the $H_2SO_4$ concentration can be 16.5 M or less.

In the etching, only the composition of the etching solution is different from that in the related art, and other etching conditions may be conditions that are performed in the related art.

The step after the etching is not particularly limited, and conductive two-dimensional particles (MXene two-dimensional particles) can be obtained by a known method. For example, the slurry after the etching is repeatedly washed by repeating centrifugation, removal of the supernatant, addition of pure water to the remaining precipitate, and centrifugation again, and then subjected to an intercalation treatment and a delamination treatment.

In the intercalation treatment, for example, the inorganic acid used in the etching solution and the Li compound of the inorganic acid are added to the moisture medium clay of MXene obtained by the washing, and the mixture is stirred at room temperature, for example. In the delamination treatment, for example, the slurry after the intercalation is centrifuged to discard the supernatant, and then pure water is added to the remaining precipitate, for example, stirring-centrifugation-recovery of the supernatant containing a single-layer/few-layer MXene by handshaking is repeated a plurality of times to obtain a MXene two-dimensional particle.

In the production method of the present embodiment, unlike Non-Patent Document 2, an ultrasonic treatment is not performed as delamination after etching.

Embodiment 3: Conductive Film

Figure 3:
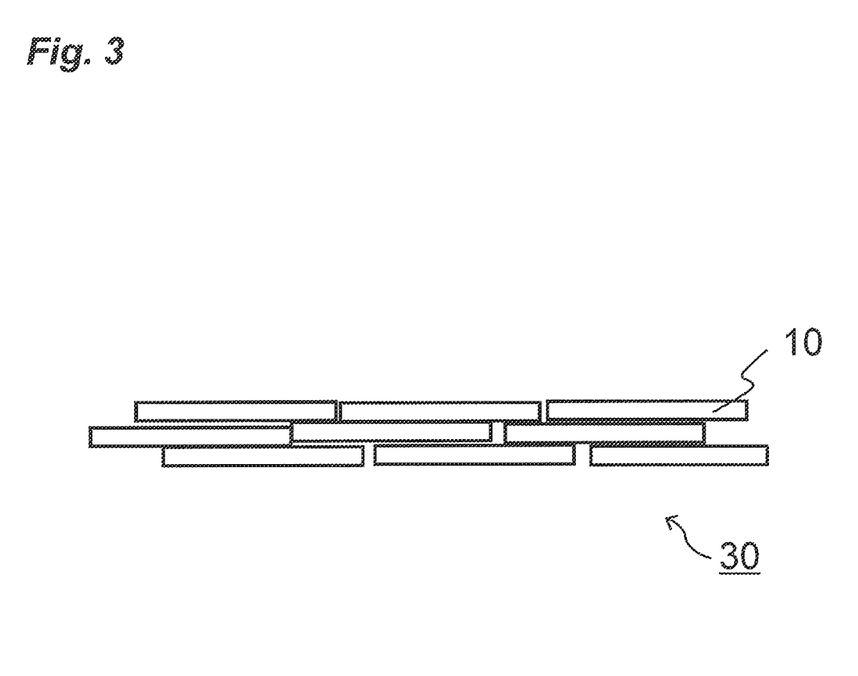
FIG. 3 is a schematic cross-sectional view illustrating a conductive film according to one embodiment of the present invention.

Examples of applications of the conductive two-dimensional particles of the present embodiment include a conductive film containing conductive two-dimensional particles. Referring to FIG. 3, the conductive film of the present embodiment will be described. FIG. 3 illustrates a conductive film 30 obtained by stacking only the conductive two-dimensional particles 10, but the present invention is not limited thereto. The conductive film may contain an additive such as a binder added at the time of film formation as necessary. The additive accounts for preferably 30 vol % or less, more preferably 10 vol % or less, still more preferably 5 vol % or less, and most preferably 0 vol % in terms of a proportion in the conductive film (when dried).

As a method for producing the conductive film without using the binder or the like, the conductive film can be produced by subjecting the supernatant containing the conductive two-dimensional particles obtained by the delamination to suction filtration. The filter is not particularly limited, but a membrane filter or the like can be used. In addition to the suction filtration, a method for applying a supernatant or clay (when the binder and a resin to be described later are contained, the binder and the resin are also contained) containing conductive two-dimensional particles to a substrate to produce a conductive film can be mentioned. Examples of the coating method include a spray coating method in which spray coating is performed using a nozzle such as a one-fluid nozzle, a two-fluid nozzle, or an air brush, a slit coating method using a table coater, a comma coater, or a bar coater, a screen printing method, a metal mask printing method, a spin coating, dip coating, or dropping. After the suction filtration or the application to the substrate, the film is appropriately dried to obtain a conductive film.

Since the conductive two-dimensional particle of the present embodiment does not have a structure in which an organic molecule having an alkyl group with low conductivity is adsorbed on the surface of MXene, the conductivity of the conductive film obtained by stacking the conductive two-dimensional particles is high.

Examples of other applications using the conductive two-dimensional particle of the present embodiment include a conductive paste containing the conductive two-dimensional particle, and a conductive composite material containing the conductive two-dimensional particle and a resin. These are also suitable for halogen-free applications and applications requiring high conductivity. Examples of the resin (polymer) include a hydrophilic polymer having a polar group, and those in which the polar group is a group that forms a hydrogen bond with a modifier or terminal T of the layer. Examples of the polymer include one or more polymers selected from the group consisting of water-soluble polyurethane, polyvinyl alcohol, sodium alginate, an acrylic acid-based water-soluble polymer, polyacrylamide, polyaniline sulfonic acid, and nylon. The proportion of the polymer in the conductive composite material film (when dried) may be more than 0 vol % and preferably 30 vol % or less.

The conductive two-dimensional particle according to one embodiments of the present invention has been described in detail through the production methods, but various modifications can be made. It should be noted that the conductive two-dimensional particle according to the present invention may be produced by a method different from the production method in the above-described embodiment, and the method for producing a conductive two-dimensional particle of the present invention is not limited only to one that provides the conductive two-dimensional particle according to the above-described embodiment.

EXAMPLES

Examples 1 to 6 and Comparative Examples 1 and 2

[Preparation of Sample]

In Examples 1 to 6, the MXene two-dimensional particles were prepared by sequentially performing the following five steps described in detail below: (1) Preparation of precursor (MAX), (2) Etching of precursor, (3) Washing, (4) Intercalation, and (5) Delamination. In Comparative Examples 1 and 2, MXene was produced in the same manner as in the above examples except that the $H_3PO_4$ concentration in the etching solution in etching of the precursor was changed.

(1) Preparation of Precursor (MAX)

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined at 1350° C. for 2 hours under an Ar atmosphere. The calcined body (block-shaped MAX) thus obtained was pulverized with an end mill to a maximum dimension of 40 µm or less. In this way, Ti₃AlC₂ particles were obtained as a precursor (MAX).
(2) Etching of Precursor
Using the Ti₃AlC₂ particles (powder) prepared by the above method, etching was performed under the following etching conditions to obtain a solid-liquid mixture (slurry) containing a solid component derived from the Ti₃AlC₂ powder.
(Etching Conditions)
  Precursor: Ti₃AlC₂ (sieving with a mesh size of 45 µm)
  Etching solution composition: Aqueous solution having HF concentration and H₃PO₄ concentration as described in Table 2 below
  Amount of precursor input: 3.0 g
  Etching container: 100 mL Aiboy
  Etching temperature: 35° C.
  Etching time: 24 h
  Stirrer rotation speed: 400 rpm
(3) Washing
The slurry was divided into two portions, each of which was inserted into two 50 mL centrifuge tubes, centrifuged under the condition of 3500 G using a centrifuge, and then the supernatant was discarded. (i) In each centrifuge tube, 40 mL of pure water was added to the clay precipitated by centrifugation and mixed to form a slurry, (ii) The step of centrifuging again at 3500 G to separate and remove the supernatant was repeated 11 times. After final centrifugation, the supernatant was discarded to obtain a Ti₃C₂T$_s$-moisture medium clay as a remaining precipitate.
(4) Intercalation
Li₃PO₄, H₃PO₄, and pure water were added to the Ti₃C₂T$_s$-moisture medium clay prepared by the above method, and the mixture was stirred at 20° C. or higher and 25° C. or lower for 15 hours to perform Li intercalation. The detailed conditions of Li intercalation are as follows.
(Conditions of Li Intercalation)
  Ti₃C₂T$_s$-moisture medium clay (MXene after washing): Solid content: 0.75 g
  Li₃PO₄: 0.68 g
  85% by mass of H₃PO₄: 3.1 mL
  H₂O: 31.9 mL
  Intercalation container: 100 mL Aiboy
  Temperature: 20° C. or higher and 25° C. or lower (room temperature)
  Time: 15 h
  Stirrer rotation speed: 800 rpm
(5) Delamination
The slurry after the Li intercalation was charged into a 50 mL centrifuge tube, centrifuged under the condition of 3500 G using a centrifuge, and then the supernatant was discarded. Subsequently, an operation of adding 40 mL of pure water to the remaining precipitate from which the supernatant was removed, stirring the mixture with a shaker for 15 minutes, then centrifuging the mixture at 3500 G, and recovering the supernatant as a single-layer/few-layer MXene-containing liquid was repeated 4 times to obtain a single-layer/few-layer MXene-containing sample.
[Evaluation]
Using the obtained MXene-containing sample, the yield of single-layer/few-layer MXene, the measurement of the phosphorus concentration in MXene, the measurement of the major diameter and thickness of the two-dimensional surface of MXene, the measurement of the chlorine concentration and the bromine concentration in MXene, and the narrow scan analysis by XPS were performed as described below.

(Yield of Single-Layer/Few-Layer MXene)
The yield of the single-layer/few-layer MXene was determined from the following formula. The results are shown in Table 2. In the following formula, "MXene that has not been formed into a single layer" refers to MXene that remains settled to the end by centrifugation in (5) Delamination.

Yield (%) of single-layer/few-layer MXene=[single-layer/few-layer MXene dry weight/(single-layer/few-layer MXene dry weight+MXene dry weight not formed into single layer)]×100

Figure 4:
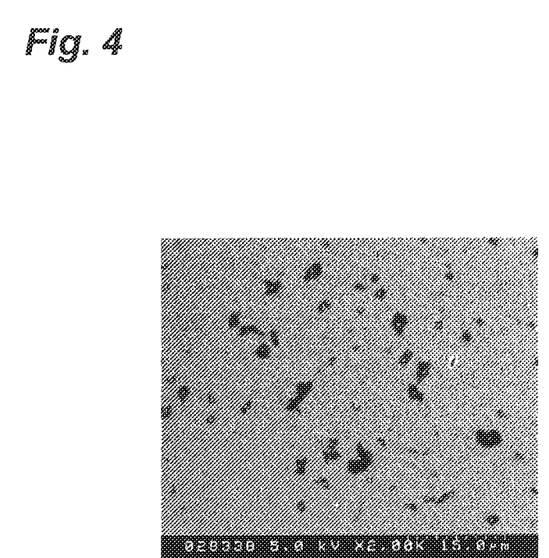
FIG. 4 is a scanning electron micrograph of the MXene particles produced in Example 2.
Figure 5:
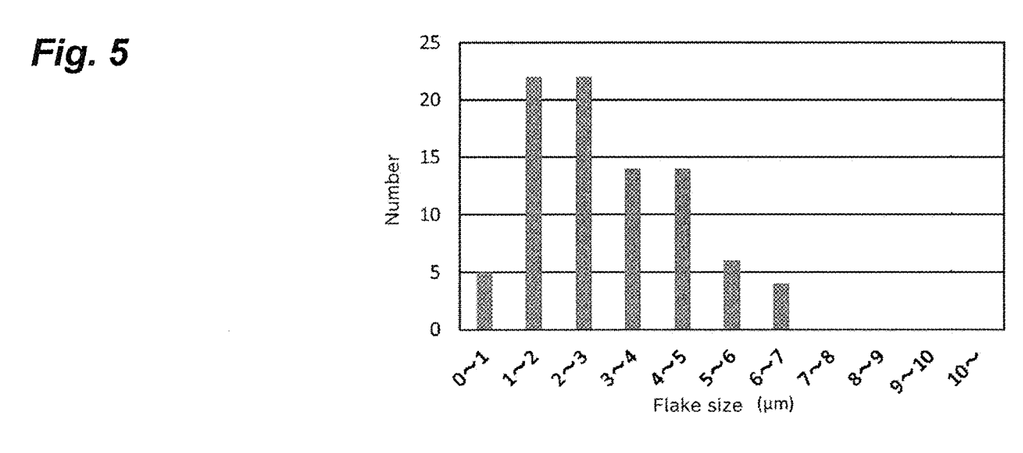
FIG. 5 is a graph illustrating a measurement result of a major diameter of a two-dimensional surface of the MXene particle produced in Example 2.
Figure 6:
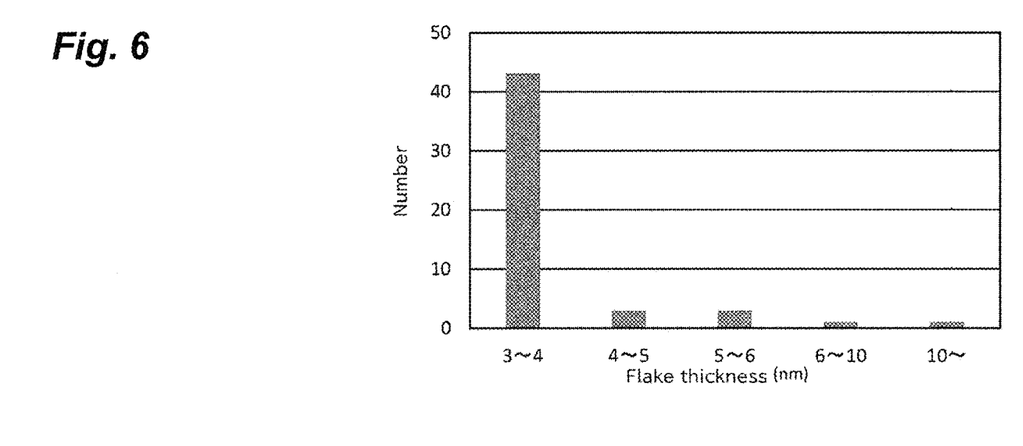
FIG. 6 is a graph illustrating a measurement result of a thickness of the MXene particles produced in Example 2.

(Measurement of Phosphorus Concentration in MXene)
The concentration of P in MXene was measured by ICP emission spectrometry using iCAP 6300 manufactured by Thermo Fisher Scientific. The results are shown in Table 2.
(Measurement of Major Diameter and Thickness of Two-Dimensional Surface of MXene)
The major diameter (flake size) of the two-dimensional surface of MXene obtained in Example 2 was measured by SEM. Specifically, the MXene slurry was applied to an alumina porous substrate and dried, and a scanning electron microscope (SEM) photograph was taken to perform measurement. Specifically, 80 or more MXene particles that can be visually confirmed in a field of view of a SEM image having a magnification of 2,000 times and a field size of 60 µm×60 µm were targeted. When a porous substrate is used as the substrate, fine black spots in the micrograph may be derived from the substrate. The background porous portion was removed by image processing, and thereafter, image analysis was performed using SEM image analysis software "A-Zou Kun" (registered trademark, manufactured by Asahi Kasei Plastics Co., Ltd.). In the image analysis, the major diameter when each MXene particle was approximated to an elliptical shape was obtained, and the number average thereof was taken as the average value of the major diameters of the two-dimensional surface.
The measurement results are illustrated in FIG. 5. The flake size category on the horizontal axis in FIG. 5, for example, the display of "0 to 1" indicates "more than 0 and 1 or less". Hereinafter, the same applies to FIGS. 8 and 10. From the results in FIG. 5, the average value of the major diameters of the two-dimensional surfaces of MXene was 3.0 µm.
For reference, FIG. 4 illustrates a SEM photograph of No. 2 in Table 1 with an average flake size of 1.00 µm. As described above, in No. 2 of Table 1, HCl is used as the etching solution, and the chlorine concentration in MXene is not reduced. In FIG. 4, the black particles are MXene particles.
In addition, the thickness of MXene obtained in Example 2 was measured using an atomic force microscope (AFM) of Dimensin FastScan manufactured by Burker Corporation. Specifically, the MXene slurry was applied to a silicon substrate and dried, an atomic force microscope (AFM) photograph was taken, and the thickness was determined from the image. The results are shown in FIG. 6. The flake thickness category on the horizontal axis in FIG. 6, for example, the display of "1 to 3" indicates "more than 1 and 3 or less". Hereinafter, the same applies to FIGS. 9 and 11. From the results in FIG. 6, the average value of the thicknesses of MXene was 3.9 nm.
(Measurement of Chlorine Concentration and Bromine Concentration in MXene)
The chlorine concentration and the bromine concentration in MXene obtained in Example 2 were measured using a combustion ion chromatography apparatus (Dionex ICS-5000) manufactured by Thermo Fisher Scientific. As a result, the chlorine concentration was 50 ppm by mass or less, and the bromine concentration was 50 ppm by mass or less, that is, the total content of chlorine and bromine was 100 ppm by mass or less.

(Narrow Scan Analysis by XPS)

Figure 7:
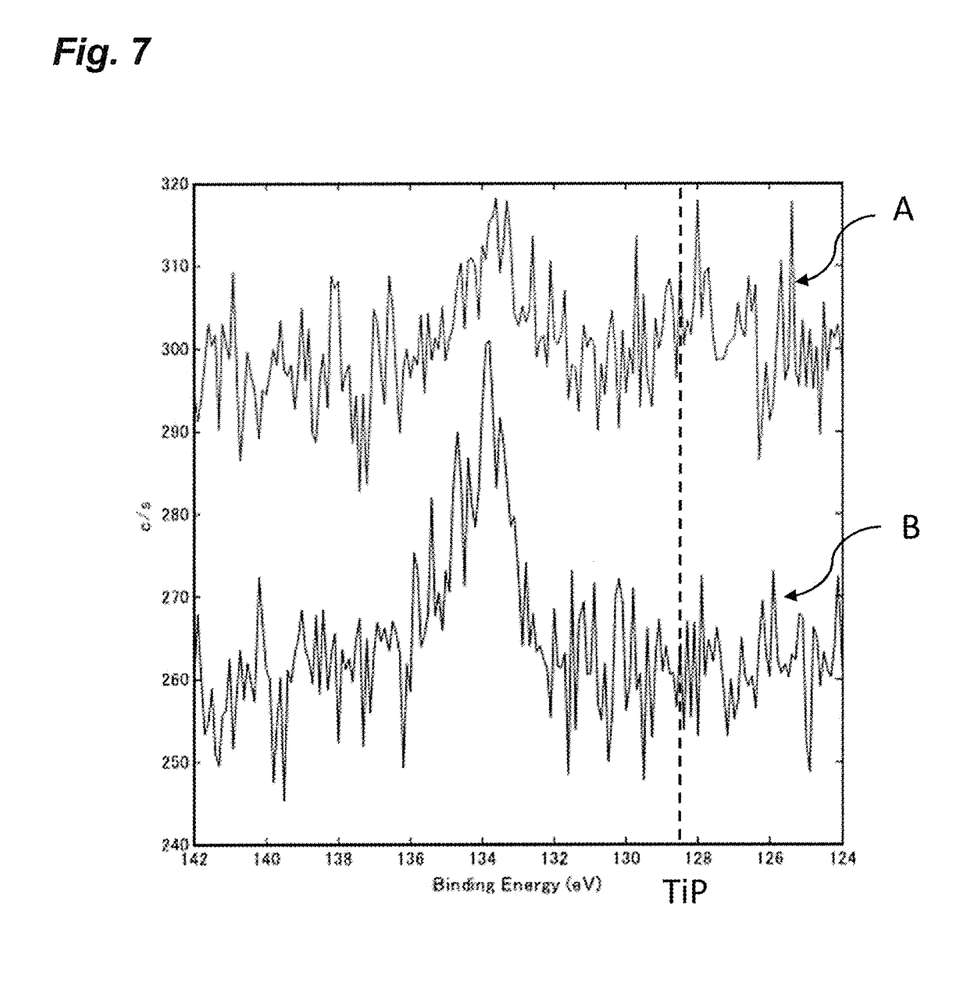
FIG. 7 is a graph illustrating a P2p narrow spectrum measurement result of the MXene particles produced in Example 2.

As an interatomic chemical bond state in MXene of Example 2, a P2p narrow spectrum was obtained by performing XPS measurement under the following conditions using a VersaProbe X-ray photoelectron spectrometer manufactured by ULVAC-PHI, INCORPORATED and performing high-resolution analysis (narrow scan analysis). The results are shown in Table 7. In FIG. 7, the spectrum in the upper part indicated by an arrow A indicates the spectrum of the single-layer/few-layer MXene, and the spectrum in the lower part indicated by an arrow B indicates the spectrum of the multilayer MXene that is not formed into a single layer. In addition, a broken line portion indicates a binding energy position of P2p of TiP, and a peak position at the center of the drawing indicates the binding energy position of P2p of titanium phosphate. From FIG. 7, it can be seen that Ti constituting MXene is bonded to phosphoric acid.

(XPS Measurement Conditions)
  Incident X-ray: Monochromatic AlKα
  X-ray output: 25.6 W
  Measurement area: Diameter 100 μm
  Photoelectron take-in angle: 45.0 degrees
  Pass energy: 23.50 eV

TABLE 2

| | HF concentration in etching solution (M) | $H_3PO_4$ concentration in etching solution (M) | P concentration in MXene (mass %) | Yield of single-layer/few-layer MXene (%) |
|---|---|---|---|---|
| Comparative Example 1 | 2.8 | 1.9 | 0.14 | 0 |
| Comparative Example 2 | 2.8 | 3.7 | 0.18 | 0 |
| Example 1 | 2.8 | 5.5 | 0.20 | 11 |
| Example 2 | 2.8 | 7.4 | 0.25 | 39 |
| Example 3 | 2.8 | 11.0 | 0.32 | 65 |
| Example 4 | 2.8 | 13.2 | 0.34 | 70 |
| Example 5 | 6.9 | 7.4 | 0.24 | 38 |
| Example 6 | 13.9 | 7.4 | 0.24 | 36 |

From these results, the following can be seen. In Comparative Examples 1 and 2, the $H_3PO_4$ concentration in the etching solution was low, and single-layer/few-layer MXene particles were not obtained when the flake size was 1.0 μm or more. While the $H_3PO_4$ concentration in the etching solution of Non-Patent Document 3 is 4.5 M, according to the present embodiment, single-layer formation occurs when the $H_3PO_4$ concentration in the etching solution is in the range of 5.5 M to 13.2 M, and it has been found that the yield of the single-layer/few-layer MXene increases as the $H_3PO_4$ concentration increases.

Since the total content of chlorine and bromine in the MXene two-dimensional particles obtained in the present embodiment is 100 ppm by mass or less, the MXene two-dimensional particles can be used for halogen-free applications. In the MXene two-dimensional particles obtained in the present embodiment, the average value of the major diameters of the two-dimensional surfaces was 1.0 μm or more and the average value of the thicknesses was 5 nm or less. In particular, from FIGS. 5 and 6, most of the MXene two-dimensional particles obtained in the present embodiment had a flake size of 1.0 μm or more and a thickness of 5 nm or less. Therefore, the MXene two-dimensional particles obtained in the present embodiment can be used to prepare a film that can be handled without adding a binder. Furthermore, since the flake size is as large as 1.0 μm or more, a film having high conductivity is obtained as shown below.

[Production of MXene Film]

Using MXene of Example 2, the supernatant containing 0.09 g of solid MXene two-dimensional particles and 40 mL of pure water obtained in (5) Delamination was subjected to suction filtration to prepare a film. As a filter for suction filtration, a membrane filter (Durapore, manufactured by Merck KGaA, pore size 0.45 μm) was used. Two MXene films of a film 1 and a film 2 were produced by this method. Then, the density and conductivity of the obtained MXene film were measured as follows.

(Measurement of Density of Film)

The film was punched into a disk shape having a diameter of 12 mm with a punch, the weight was measured with an electronic balance, and the thickness was measured with a micrometer. Then, the film density was calculated from these measured values. The results are shown in Table 3.

(Measurement of Conductivity of Film)

The conductivity of the obtained MXene film was determined. For the conductivity, the resistivity (Ω) and the thickness (μm) were measured at three points per sample, the conductivity (S/cm) was calculated from these measured values, and the average value of three conductivities obtained by this calculation was adopted. For resistivity measurement, the surface resistance of the film was measured by a four-terminal method using a simple low resistivity meter (Loresta AX MCP-T370, manufactured by Mitsubishi Chemical Analytech Co., Ltd.). A micrometer (MDH-25 MB, manufactured by Mitutoyo Corporation) was used for the thickness measurement. Then, the volume resistivity was determined from the obtained surface resistance and film thickness, and the conductivity was determined by taking the reciprocal of the value. The results are shown in Table 3.

TABLE 3

| | Film density (g/cm$^3$) | Conductivity (S/cm) |
|---|---|---|
| Film 1 | 1.95 | 5957 |
| Film 2 | 1.95 | 6403 |

From the results in Table 3 above, the MXene film produced using the MXene two-dimensional particles of the present embodiment without adding a binder had a conductivity of 5,000 S/cm or more, and showed a high conductivity.

Examples 7 to 12 and Comparative Examples 3 and 4

[Preparation of Sample]

In Examples 7 to 12, except that the etching conditions and the Li intercalation conditions were as follows, the same procedure as in Examples 1 to 6 was carried out to sequentially perform five steps of (1) Preparation of precursor (MAX), (2) Etching of precursor, (3) Washing, (4) Intercalation, and (5) Delamination to prepare MXene two-dimensional particles. In Comparative Examples 3 and 4, MXene two-dimensional particles were produced in the same manner as in the above examples except that the HI concentration in the etching solution in etching of the precursor was changed.

Figure 8:
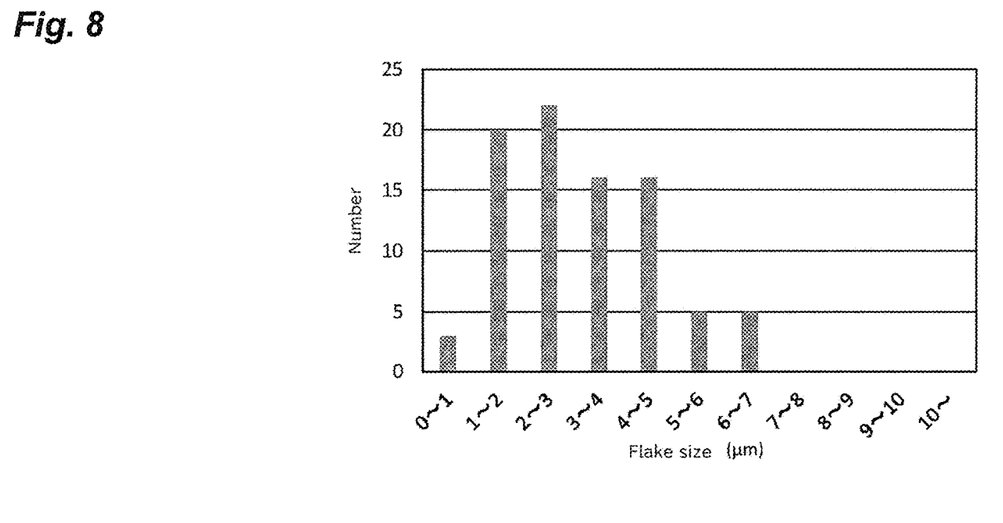
FIG. 8 is a graph illustrating a measurement result of a major diameter of a two-dimensional surface of the MXene particle produced in Example 7.
Figure 9:
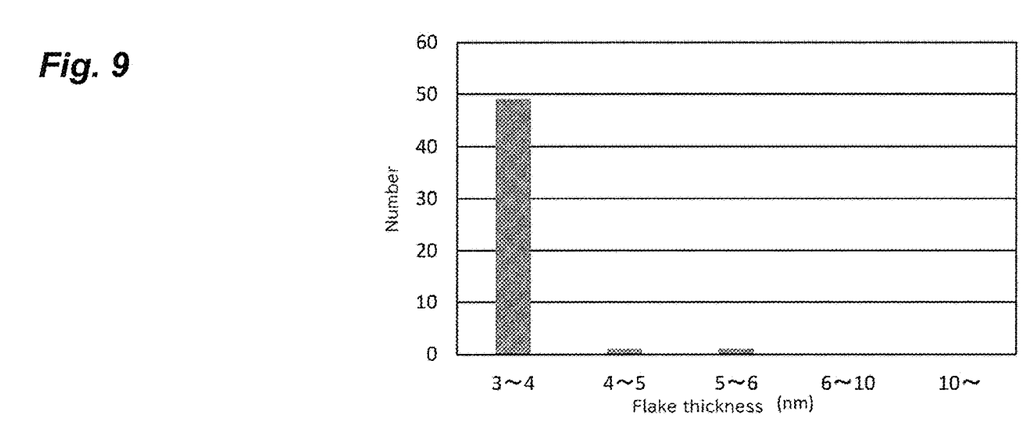
FIG. 9 is a graph illustrating a measurement result of a thickness of the MXene particles produced in Example 7.

(Etching Conditions)
  Precursor: $Ti_3AlC_2$ (sieving with a mesh size of 45 μm)
  Etching solution composition: Aqueous solution having HF concentration and HI concentration as described in Table 4 below
  Amount of precursor input: 3.0 g
  Etching container: 100 mL Aiboy
  Etching temperature: 35° C.
  Etching time: 24 h
  Stirrer rotation speed: 400 rpm
(Conditions of Li Intercalation)
  $Ti_3C_2T_s$-moisture medium clay (MXene after washing):
    Solid content: 0.75 g
  LiI: 2.37 g
  55 mass % HI: 0.7 mL
  $H_2O$: 34.3 mL
  Intercalation container: 100 mL Aiboy
  Temperature: 20° C. or higher and 25° C. or lower (room temperature)
  Time: 15 h
  Stirrer rotation speed: 800 rpm
[Evaluation]
  Using the obtained MXene-containing sample, the yield of single-layer/few-layer MXene, the measurement of the iodine concentration in MXene, the measurement of the major diameter and thickness of the two-dimensional surface of MXene, and the measurement of the chlorine concentration and the bromine concentration in MXene were performed as described below.
(Yield of Single-Layer MXene)
  The yield of the single-layer/few-layer MXene was determined in the same manner as in Examples 1 to 6. The results are shown in Table 4.
(Measurement of Iodine Concentration in MXene)
  The iodine (I) concentration in MXene was measured using a combustion ion chromatography apparatus (Dionex ICS-5000) manufactured by Thermo Fisher Scientific. The results are shown in Table 4.
(Measurement of Major Diameter and Thickness of Two-Dimensional Surface of MXene)
  The major diameter and thickness of the two-dimensional surface of MXene of Example 7 were measured in the same manner as in Examples 1 to 6. The results are shown in FIGS. 8 and 9, respectively. From the results in FIG. 8, the average value of the major diameters of the two-dimensional surfaces of MXene was 3.2 μm. Further, from the results of FIG. 9, the average value of the thickness of MXene was 3.6 nm.
(Measurement of Chlorine Concentration and Bromine Concentration in MXene)
  The chlorine concentration and the bromine concentration in MXene of Example 7 were measured in the same manner as in Examples 1 to 6. As a result, the chlorine concentration was 50 ppm by mass or less, and the bromine concentration was 50 ppm by mass or less, that is, the total content of chlorine and bromine was 100 ppm by mass or less.

TABLE 4

| | HF concentration in etching solution (M) | HI concentration in etching solution (M) | I concentration in MXene (mass %) | Yield of single-layer/few-layer MXene (%) |
|---|---|---|---|---|
| Comparative Example 3 | 2.8 | 1.2 | 0.2 | 0 |
| Comparative Example 4 | 2.8 | 2.5 | 0.5 | 0 |
| Example 7 | 2.8 | 5.0 | 1.0 | 24 |
| Example 8 | 1.5 | 5.2 | 0.8 | 18 |
| Example 9 | 2.8 | 5.2 | 0.7 | 30 |
| Example 10 | 6.0 | 5.2 | 0.6 | 64 |
| Example 11 | 9.0 | 5.2 | 0.8 | 62 |
| Example 12 | 2.8 | 6.5 | 1.5 | 52 |

From these results, the following can be seen. In Comparative Examples 3 and 4, the HI concentration in the etching solution was low, and single-layer/few-layer MXene particles were not obtained when the flake size was 1.0 μm or more. While the HI concentration in the etching solution of Non-Patent Document 3 is 4.5 M, according to the present embodiment, single-layer formation occurs when the HI concentration in the etching solution is in the range of 5.0 M to 6.5 M, and it has been found that the yield of the single-layer/few-layer MXene increases as the HI concentration increases. In addition, it has been found that the yield of the single-layer/few-layer MXene is further increased by increasing the HI concentration together with the HF concentration.

Since the total content of chlorine and bromine in the MXene two-dimensional particles obtained in the present embodiment is 100 ppm by mass or less, the MXene two-dimensional particles can be used for halogen-free applications. In the MXene two-dimensional particles obtained in the present embodiment, the average value of the major diameters of the two-dimensional surfaces was 1.0 μm or more and the average value of the thicknesses was 5 nm or less. In particular, from FIGS. 8 and 9, most of the MXene two-dimensional particles obtained in the present embodiment had a flake size of 1.0 μm or more and a thickness of 5 nm or less. Therefore, the MXene two-dimensional particles obtained in the present embodiment can be used to prepare a film that can be handled without adding a binder. Furthermore, since the flake size is as large as 1.0 μm or more, a film having high conductivity is obtained as shown below.

[Production of MXene Film]
  Using MXene of Example 7, the supernatant containing 0.05 g of solid MXene two-dimensional particles and 40 mL of pure water obtained in (5) Delamination was subjected to suction filtration to prepare a film. As a filter for suction filtration, a membrane filter (Durapore, manufactured by Merck KGaA, pore size 0.45 μm) was used.
  The density and conductivity of the produced film were measured in the same manner as in the case of the film of Example 2. As a result, the film density of the film was 2.82 g/cm³, and the conductivity was 8,000 S/cm.
  From the results above, the MXene film produced using the MXene two-dimensional particles of the present embodiment without adding a binder had a conductivity of 5,000 S/cm or more, and further 7,000 S/cm or more, and exhibited high conductivity.

Examples 13 to 15 and Comparative Examples 5 and 6

[Preparation of Sample]
  In Examples 13 to 15, except that the etching conditions and the Li intercalation conditions were as follows, the same procedure as in Examples 1 to 6 was carried out to sequentially perform five steps of (1) Preparation of precursor (MAX), (2) Etching of precursor, (3) Washing, (4) Intercalation, and (5) Delamination to prepare MXene two-dimensional particles. In Comparative Examples 5 and 6, MXene two-dimensional particles were produced in the same manner as in the above examples except that the $H_2SO_4$ concentration in the etching solution in etching of the precursor was changed.

(Etching Conditions)
   Precursor: $Ti_3AlC_2$ (sieving with a mesh size of 45 μm)
   Etching solution composition: Aqueous solution having HF concentration and $H_2SO_4$ concentration as described in Table 5 below
   Amount of precursor input: 3.0 g
   Etching container: 100 mL Aiboy
   Etching temperature: 35° C.
   Etching time: 24 h
   Stirrer rotation speed: 400 rpm (Conditions of Li Intercalation)
   $Ti_3C_2T_s$-moisture medium clay (MXene after washing): Solid content: 0.75 g
   $Li_2SO_4 \cdot H_2O$: 2.26 g
   $H_2O$: 34.7 mL
   98 mass % $H_2SO_4$: 0.3 mL
   Intercalation container: 100 mL Aiboy
   Temperature: 20° C. or higher and 25° C. or lower (room temperature)
   Time: 15 h
   Stirrer rotation speed: 800 rpm

[Evaluation]

Using the obtained MXene-containing sample, the yield of single-layer/few-layer MXene, the measurement of the sulfur (S) concentration in MXene, the measurement of the major diameter and thickness of the two-dimensional surface of MXene, and the measurement of the chlorine concentration and the bromine concentration in MXene were performed as described below.

(Yield of Single-Layer/Few-Layer MXene)

The yield of the single-layer/few-layer MXene was determined in the same manner as in Examples 1 to 6. The results are shown in Table 5.

(Measurement of Sulfur (S) Concentration in MXene)

Using the obtained single-layer MXene-containing sample, the sulfur (S) concentration in MXene was measured by combustion in an oxygen stream (high-frequency heating furnace method)-infrared absorption method using EMIA-920 V2/FA manufactured by HORIBA, Ltd. The results are shown in Table 5.

(Measurement of Major Diameter and Thickness of Two-Dimensional Surface of MXene)

Figure 10:
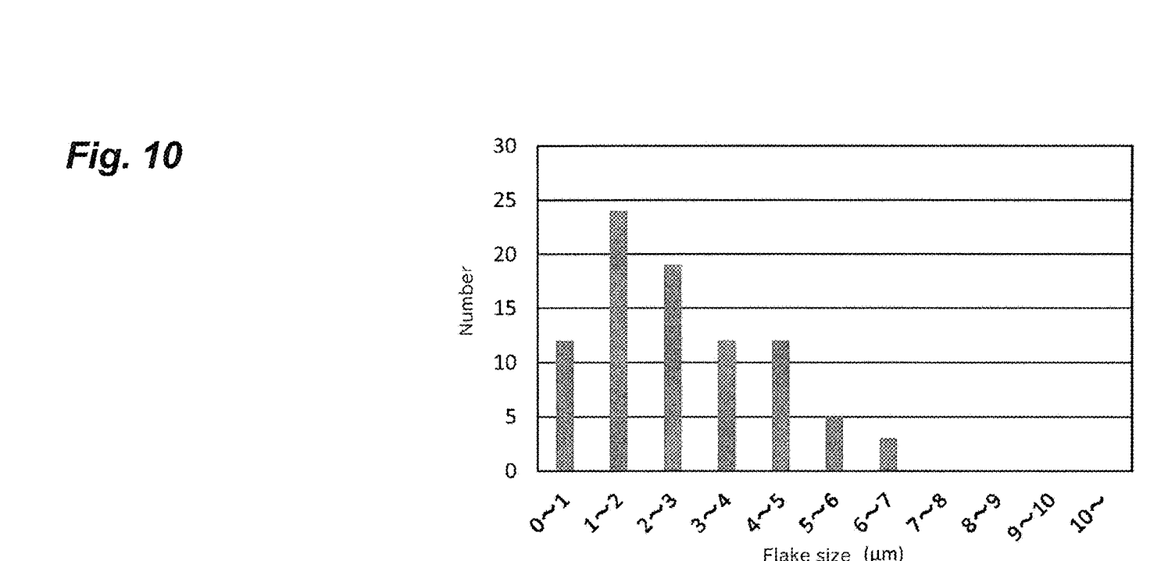
FIG. 10 is a graph illustrating a measurement result of a major diameter of a two-dimensional surface of the MXene particle produced in Example 13.
Figure 11:
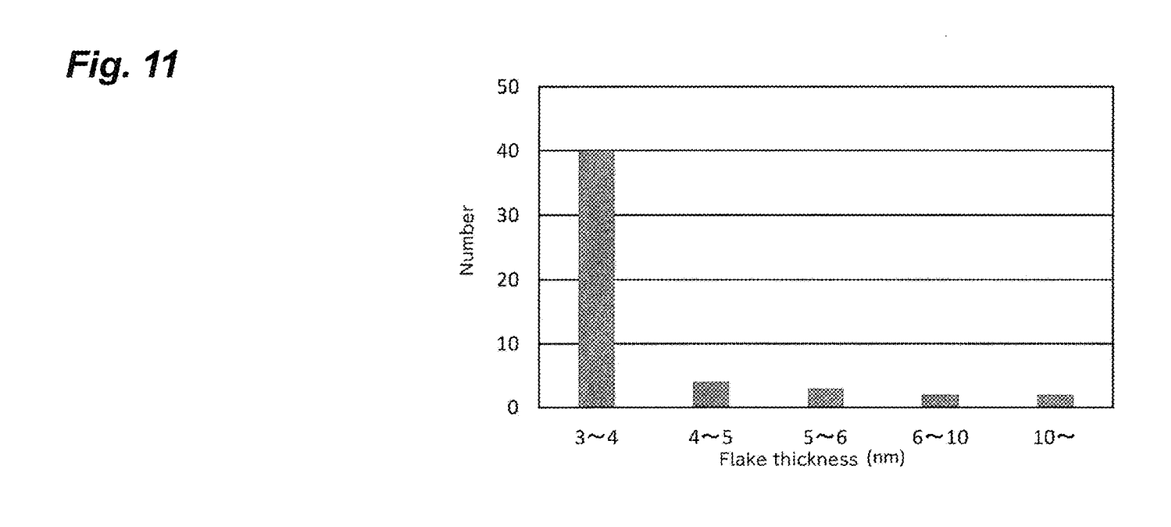
FIG. 11 is a graph illustrating a measurement result of a thickness of the MXene particles produced in Example 13.

The major diameter and thickness of the two-dimensional surface of MXene of Example 13 were measured in the same manner as in Examples 1 to 6. The results are shown in FIGS. 10 and 11, respectively. From the results in FIG. 10, the average value of the major diameters of the two-dimensional surfaces of MXene was 2.7 μm. Further, from the results of FIG. 11, the average value of the thickness of MXene was 4.2 nm.

(Measurement of Chlorine Concentration and Bromine Concentration in MXene)

The chlorine concentration and the bromine concentration in MXene of Example 13 were measured in the same manner as in Examples 1 to 6. As a result, the chlorine concentration was 50 ppm by mass or less, and the bromine concentration was 50 ppm by mass or less, that is, the total content of chlorine and bromine was 100 ppm by mass or less.

TABLE 5

| | HF concentration in etching solution (M) | $H_2SO_4$ concentration in etching solution (M) | S concentration in MXene (mass %) | Yield of single-layer/few-layer MXene (%) |
|---|---|---|---|---|
| Comparative Example 5 | 2.8 | 1.2 | 0.01 | 0 |
| Comparative Example 6 | 2.8 | 2.5 | 0.02 | 0 |
| Example 13 | 2.8 | 5.0 | 0.03 | 23 |
| Example 14 | 2.8 | 7.4 | 0.04 | 47 |
| Example 15 | 2.8 | 16.5 | 0.10 | 52 |

From these results, the following can be seen. In Comparative Examples 5 and 6, the $H_2SO_4$ concentration in the etching solution was low, and single-layer/few-layer MXene particles were not obtained when the flake size was 1.0 μm or more. While the $H_2SO_4$ concentration in the etching solution of Non-Patent Document 3 is 4.5 M, according to the present embodiment, single-layer formation occurs when the $H_2SO_4$ concentration in the etching solution is in the range of 5.0 M to 7.4 M, and it has been found that the yield of the single-layer/few-layer MXene increases as the $H_2SO_4$ concentration increases.

Since the total content of chlorine and bromine in the MXene two-dimensional particles obtained in the present embodiment is 100 ppm by mass or less, the MXene two-dimensional particles can be used for halogen-free applications. In the MXene two-dimensional particles obtained in the present embodiment, the average value of the major diameters of the two-dimensional surfaces was 1.0 μm or more and the average value of the thicknesses was 5 nm or less. In particular, from FIGS. 10 and 11, most of the MXene two-dimensional particles obtained in the present embodiment had a flake size of 1.0 μm or more and a thickness of 5 nm or less. Therefore, the MXene two-dimensional particles obtained in the present embodiment can be used to prepare a film that can be handled without adding a binder. Furthermore, since the flake size is as large as 1.0 μm or more, a film having high conductivity is obtained as shown below.

[Production of MXene Film]

Using MXene of Example 13, the supernatant containing 0.06 g of solid MXene two-dimensional particles and 40 mL of pure water obtained in (5) Delamination was subjected to suction filtration to prepare a film. As a filter for suction filtration, a membrane filter (Durapore, manufactured by Merck KGaA, pore size 0.45 μm) was used.

The density and conductivity of the produced film were measured in the same manner as in the case of the film of Example 2. As a result, the density of the film was 1.58 $g/cm^3$, and the electrical was 5,130 S/cm.

From the results above, the MXene film produced using the MXene two-dimensional particles of the present embodiment without adding a binder achieved a conductivity of 5,000 S/cm or more, and showed a high conductivity.

The paste and conductive film of the present invention can be used in any suitable application, and can be particularly, preferably used, for example, as electrodes in electrical devices.

DESCRIPTION OF REFERENCE SIGNS 1a, 1b: Layer body ($M_mX_n$ layer)
3a, 5a, 3b, 5b: Modifier or terminal T
7a, 7b: MXene layer 10, 10a, 10b: MXene particles (particles of layered material)
30: Conductive film

The invention claimed is:

1. A conductive two-dimensional particle of a layered material comprising one layer or one layer and plural layers, wherein the layer includes a layer body represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T exists on a surface of the layer body, wherein T is at least one selected from the group consisting of a hydroxyl group, a fluorine atom, a chlorine atom, an oxygen atom, or a hydrogen atom,
the M is also bonded to at least one selected from the group consisting of $PO_4^{3-}$, I, or $SO_4^{2-}$,
a total content of chlorine and bromine is 1,500 ppm by mass or less, and
an average value of major diameters of two-dimensional surfaces of the conductive two-dimensional particles is 1.0 μm or more.

2. The conductive two-dimensional particle according to claim 1, wherein the conductive two-dimensional particle satisfies at least one of:
a phosphorus atom content of 0.20 mass % to 14 mass %,
an iodine atom content of 1.0 mass % to 60 mass %, or
a sulfur atom content of 0.03 mass % to 18 mass %.

3. The conductive two-dimensional particle according to claim 2, wherein an average value of a thicknesses of the conductive two-dimensional particles is 5 nm or less.

4. The conductive two-dimensional particle according to claim 1, wherein an average value of a thicknesses of the conductive two-dimensional particles is 5 nm or less.

5. A conductive film comprising the conductive two-dimensional particle according to claim 1.

6. A conductive paste comprising the conductive two-dimensional particle according to claim 1.

7. A conductive composite material comprising:
the conductive two-dimensional particle according to claim 1; and
a resin.

8. The conductive composite material according to claim 7, wherein the resin is one or more polymers selected from the group consisting of water-soluble polyurethane, polyvinyl alcohol, sodium alginate, an acrylic acid-based water-soluble polymer, polyacrylamide, polyaniline sulfonic acid, and nylon.

* * * * *